United States Patent [19]

Nishizawa et al.

[11] 4,022,955

[45] May 10, 1977

[54] THERMOSETTING COATING COMPOSITION COMPRISING A HYDROXY ACRYLATE ESTER COPOLYMER AND N-ACYLPOLYLACTAM OR N-ACYLPOLYIMIDE

[75] Inventors: Hiroshi Nishizawa; Minoru Fuzishima, both of Hitachi, Japan

[73] Assignee: Hitachi Chemical Company, Ltd., Tokyo, Japan

[22] Filed: July 1, 1975

[21] Appl. No.: 592,182

[30] Foreign Application Priority Data

July 3, 1974 Japan .............................. 49-75287

[52] U.S. Cl. .............................. 526/16; 260/78 L; 526/50; 526/218; 526/273; 526/317

[51] Int. Cl.² .............. C08F 120/00; C08F 220/00; C08F 8/32; C08F 220/04

[58] Field of Search .............. 260/78.4 D, 85.5 ES, 260/85.5 S, 85.5 R, 86.1 N, 86.1 E, 87.3, 78 L; 526/16, 50, 78 L

[56] References Cited

UNITED STATES PATENTS

| | | | |
|---|---|---|---|
| 2,993,021 | 7/1961 | Bauley | 260/78.4 D |
| 3,597,401 | 8/1971 | McGrath et al. | 260/78 L |
| 3,660,327 | 5/1972 | Loncrini et al. | 260/78 L |
| 3,726,945 | 4/1973 | Bottenbruch et al. | 260/78 L |
| 3,733,302 | 5/1973 | Klehe et al. | 260/78.4 D |
| 3,759,876 | 9/1973 | Matzner et al. | 260/78 L |
| 3,803,101 | 4/1974 | Matsuo | 260/78 L |
| 3,813,367 | 5/1974 | Matzner et al. | 260/78 L |

OTHER PUBLICATIONS

Chem. Abs. 4775f Katsuhiko et al. "Increasing the Viscosity of Polyesters".

*Primary Examiner*—Joseph L. Schofer
*Assistant Examiner*—Herbert J. Lilling
*Attorney, Agent, or Firm*—Armstrong, Nikaido & Marmelstein

[57] ABSTRACT

When an N-acylpolylactam or N-acylpolyimide compound is incorporated into an acrylic copolymer containing as a functional group a hydroxyl group, a thermosetting resinous composition suitable for the production of a paint, especially a powder paint, is obtained. A powder paint prepared from this resinous composition does not cause blocking below 50° C. and therefore, it has a very good storage stability. The powder paint has a free flowability at room temperature and exhibits good melt flow characteristics when heated above 130° C. for baking. Coating films prepared from this coating composition are excellent in the mechanical resistance, adhesion to the substrate, weather resistance, corrosion resistance and solvent resistance. When said acrylic copolymer further contains as a functional group a carboxyl or glycidyl group, the resulting resinous composition has further improved properties useful for a paint.

5 Claims, No Drawings

THERMOSETTING COATING COMPOSITION COMPRISING A HYDROXY ACRYLATE ESTER COPOLYMER AND N-ACYLPOLYLACTAM OR N-ACYLPOLYIMIDE

BACKGROUND OF THE INVENTION

This invention relates to a thermosetting resinous composition of the novel curing system which is suitable for the production of a paint. More specifically, the invention relates to a thermosetting resinous coating composition which comprises an acrylic copolymer containing as a functional group a hydroxyl group and a novel curing agent selected from N-acylpolylactam compounds, N-acylpolyimide compounds and mixtures thereof. This thermosetting resinous composition may be formed into either a powder paint or a solvent type paint.

In general, resinous compositions to be used for manufacture of powder paints are required to have the following properties:

(1) The composition should be solid at room temperature so that it can easily be pulverized to powder.

(2) The composition in the powdery state should not cause blocking at a temperature lower than 50° C. and it should have a free flowability at such temperature.

(3) When baking is conducted at a temperature higher than 130° C., it should exhibit melt flow characteristics suitable for obtaining a smooth surface coating and a suitable gelation time.

(4) At a casting temperature approximating 100° C., premature cross-linking reaction should not be caused and the resin component can easily be kneaded with a pigment, a flow modifier, an antistatic agent and other additives.

(5) The composition should have, after baking, cross-linking density and glass transition temperature enough to provide a sufficient mechanical strength.

It is apparent that selection of not only a resin to be used as the substrate but also a curing agent (cross-linking agent) is very important for obtaining a resinous composition satisfying all of these requirements.

Epoxy resins have heretofore been used as resins for powder paints, but powder paints including an epoxy resin have a very low weather resistance when used in fields where the resulting coatings undergo outdoor exposure. As a resin providing a coating excellent in the weather resistance, there is known an acrylic resin including as a cross-linking agent a melamine derivative modified with an ether having 1 to 4 carbon atoms, but this resinous composition is defective in that blocking is caused with increase of the ambient temperature in summer and the storage stability is insufficient.

Further, a carboxyl group-containing acrylic resin and a polyester resin including as a cross-linking agent an epoxy resin such as triglycidyl isocyanurate are known as resins for powder paints. Also these resins are defective in that blocking is caused with increase of the ambient temperature and the storage stability is insufficient. Further, properties of coatings formed from these resins are inferior.

Still further, there is known a powder paint comprising a glycidyl group-containing acrylic resin and a polybasic carboxylic acid such as 1,10-decane-dicarboxylic acid. This composition, however, is insufficient in the pigment-dispersing property.

As commercial solvent-type paints to be baked, there have heretofore been used melamine-alkyd resin paints, melamine-acrylic resin paints, phenol-epoxy resin paints and the like. Namely, in most of solvent-type paints heretofore used in the art, a formalin type resin such as a melamine resin and a phenolic resin is used as the cross-linking agent. The formalin type resin is excellent in weather resistance, chemical resistance and water resistance, but it is insufficient in flexibility and adhesion. Further, free formaldehyde used for the production of such resin is left in the paint, and at the step of heating and baking, free formaldehyde is generated and released with advance of the curing reaction. Accordingly, the atmosphere in a painting workhouse is contaminated with formaldehyde and its smell irritates workers. As a curing agent or cross-linking agent overcoming this disadvantage, use of a blocked isocyanate or the like has been proposed, but satisfactory results cannot be obtained even by this proposal.

SUMMARY OF THE INVENTION

This invention has now been completed as a result of our research made with a view to developing a thermosetting resinous composition which can overcome the foregoing defects and disadvantages involved in the conventional techniques.

It is therefore an object of this invention to provide a thermosetting resinous composition for production of a powder paint, which satisifies all of the above-mentioned requirements for a resinous composition for a powder paint and can yield a powder paint capable of providing a coating excellent in various points.

Another object of this invention is to provide a thermosetting resinous composition for production of a solvent-type paint which can overcome the above-mentioned defects involved in the conventional solvent-type paints and which can yield a solvent-type paint capable of providing a coating excellent in weather resistance, adhesion, flexibility, chemical resistance and corrosion resistance.

Other objects and advantages of this invention will be apparent from the following description.

Essentially, in accordance with this invention, there is provided a thermosetting coating composition comprising (A) 100 parts by weight of a copolymer obtained by copolymerizing (a) 5 to 40% by weight of an unsaturated compound containing a hydroxyl group and (b) 60 to 95% by weight of an unsaturated compound copolymerizable with said compound (a), said copolymer (A) having a number average molecular weight of 2,000 to 150,000, and (B) 5 to 40 parts by weight of a member selected from the group consisting of an N-acylpolylactam compound represented by the general formula

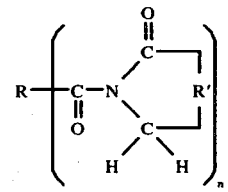

(1)

wherein R is an alkylene group having 2 to 12 carbon atoms, preferably 4 to 8 carbon atoms, which may include 1 to 2 nitrogen or oxygen atoms or may contain locally an unsaturated linkage, a di- to tetra-valent benzene nucleus which may have a substituent on the benzene nucleus, or a di- to tri-valent heterocyclic residue having 3 to 15 carbon atoms; R' stands for an alkylene group having 1 to 11 carbon atoms, preferably 3 to 8 carbon atoms; and $n$ is an integer of 2 to 4, an N-acylpolyimide compound represented by the general formula

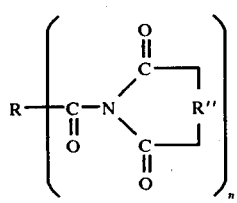
(II)

wherein R and $n$ are as defined above and R" stands for an alkylene group having 1 to 11 carbon atoms, preferably 3 to 8 carbon atoms or a di-valent benzene nucleus, and mixtures thereof.

In accordance with another preferred embodiment of this invention, there is provided a thermosetting coating composition as set forth above wherein the copolymer (A) is one obtained by copolymerizing said compounds (a) and (b) with (c) an unsaturated compound containing a carboxyl group and copolymerizable with said compounds (a) and (b), the amount of said compound (c) being such that the compound (a) occupies 5 to 40% by weight of the sum of the compounds (a), (b) and (c) and the compound (c) occupies up to 20% by weight, preferably 3 to 20% by weight, of the sum of the compounds (a), (b) and (c).

In accordance with still another preferred embodiment of this invention, there is provided a thermosetting coating composition as set forth above wherein the copolymer (A) is one obtained by copolymerizing said compounds (a) and (b) with (d) an unsaturated compound containing a glycidyl group and copolymerizable with said compounds (a) and (b), the amount of said compound (d) being such that the compound (a) occupies 5 to 40% by weight of the sum of compounds (a), (b) and (d) and the compound (d) occupies up to 30% by weight, preferably 3 to 30% by weight, of the sum of the compounds (a), (b) and (d).

DETAILED DESCRIPTION OF THE INVENTION

In essence, the thermosetting coating composition of this invention comprises (A) an acrylic copolymer containing as a functional group a hydroxyl group, preferably with carboxyl or glycidyl group and (B) at least one member selected from N-acylpolylactam compounds and N-acylpolyimide compounds.

The hydroxyl group-containing acrylic copolymer (A) to be used as the resinous component in this invention will now be described.

The acrylic copolymer component (A) to be used in the thermosetting coating composition of this invention is characterized in that it contains at least a hydroxyl group as a functional group. This acrylic copolymer (A) may contain as functional groups a carboxyl group or glycidyl group in addition to a hydroxyl group.

In general, this acrylic copolymer (A) is prepared by copolymerizing a hydroxyl group-containing unsaturated compound [compound (a)] with an unsaturated compound [compound (b)] copolymerizable with the compound (a). Copolymerization can be accomplished by known customary polymerization methods such as emulsion polymerization, suspension polymerization, solution polymerization, bulk polymerization and the like. It is preferred that the copolymerization be carried out according to solution polymerization or bulk polymerization.

As the solvent to be used for a solution polymerization, there can be mentioned toluene, xylene, methyethyl ketone, ethyl acetate, butyl acetate, cellosolve and other solvents customarily used in this field. When the thermosetting coating composition of this invention is formed into a solvent-type paint, the solvent used for the polymerization may be utilized as a solvent for the paint.

As the polymerization catalyst, there can be used, for example, benzoyl peroxide t-butyl hydroperoxide and azobisisobutyronitrile. In general, the catalyst is used in an amount of 0.5 to 3% by weight based on the unsaturated compounds.

It is indispensable that in preparing the acrylic copolymer (A), the compound (a) should be used in an amount of 5 to 40% by weight based on the sum of the unsaturated compounds. If the amount of the compound (a) is smaller than 5% by weight, no sufficient cross-linkage can be attained by reaction with the curing agent (B) as detailed hereinafter. If the amount of the compound (a) is larger than 40% by weight, the resulting coating is insufficient in the water resistance and corrosion resistance.

As the compound (a) to be used in this invention, there can be employed, for example, hydroxyalkyl acrylates and hydroxyalkyl methacrylates such as 2-hydroxyethyl acrylate, 2-hydroxypropyl acrylate, 2-hydroxyethyl methacrylate and 2-hydroxypropyl methacrylate. In addition, there can be used acrylic acid and methacrylic acid esters of compounds containing two or more OH groups, such as glycols, glycerin, trimethylol propane and pentaerythritol. As examples of such ester, there can be mentioned ethylene glycol monoacrylate, propylene glycol monoacrylate, butylene glycol monoacrylate, and corresponding methacrylates.

As the compound (b), there are used unsaturated monomers customarily used for the production of acrylic paints, for example, styrene type monomers such as styrene, vinyltoluene and α-methylstyrene, alkyl acrylates such as methyl acrylate, ethyl acrylate, propyl acrylate and butyl acrylate, alkyl methacrylates such as methyl methacrylate, ethyl methacrylate, propyl methacrylate and butyl methacrylate, and vinyl acetate, acrylonitrile and acrylamide.

The acrylic copolymer (A) to be used in this invention may preferably contain a carboxyl group or a glycidyl group in addition to a hydroxyl group. This preferred acrylic copolymer is prepared by copolymerizing the above-mentioned compounds (a) and (b) with (c) an unsaturated compound containing a carboxyl group and copolymerizable with said compounds (a) and (b), or with (d) an unsaturated compound containing a glycidyl group and copolymerizable with said compounds (a) and (b).

The compound (c) is used for promoting and improving the curing characteristics of the resulting thermosetting coating composition. When this compound (c) is used for the production of the acrylic copolymer (A), the amount of the compound (c) is so selected that the compound (a) occupies 5 to 40% by weight of the sum of the unsaturated compounds (a), (b) and (c) and the compound (c) occupies up to 20% by weight of the unsaturated compounds (a), (b) and (c). If the amount of the compound (c) exceeds 20% by weight, a large quantity of the free carboxylic acid is left in the cured coating film and it is inferior in the water resistance. The lower limit of the amount of the compound (c) is not particularly critical, but if the amount of the compound (c) is too small, no substantial effect can be attained by the use of the compound (c). Accordingly, it is generally preferred that the compound (c) be used in an amount of 3 to 20% by weight based on the unsaturated compounds (a), (b) and (c).

As the compound (c), there are preferably employed acrylic acid, methacrylic acid, itaconic acid, maleic acid, fumaric acid, crotonic acid and the like.

The compound (d) is used for increasing the density of the cross-linkage in the cured coating film to improve such properties as hardness, stain resistance and solvent resistance. When this compound (d) is used for the production of the acrylic copolymer (A), the amount of the compound (d) is so selected that the compound (a) occupies 5 to 40% by weight of the sum of the unsaturated compounds (a), (b) and (d) and the compound (d) occupies up to 30% by weight of the sum of the unsaturated compounds (a), (b) and (d). If the amount of the compound (d) is larger, gelation or viscosity increase is caused to occur at the copolymer-preparing step or at the solvent-removing step. The lower limit of the amount of the compound (d) is not particularly critical, but if the amount of the compound (d) is too small, no substantial effect can be obtained by the use of the compound (d). Accordingly, it is generally preferred that the compound (d) be used in an amount of 3 to 30% by weight based on the sum of the unsaturated compounds (a), (b) and (d).

As the compound (d), there are preferably employed glycidyl acrylate, glycidyl methacrylate, allyl glycidyl and the like.

When such acrylic copolymer (A) is prepared according to solution polymerization and the copolymer (A) is used as a resin component of a powder paint, the solvent used for the polymerization should be removed after completion of the polymerization. The removal of the solvent is accomplished by means of a film evaporator, a spray drier, a screw evaporator or the like. It is also possible to add a poor solvent to the resulting reaction mixture to precipitate the copolymer. In case the solvent used for the copolymerization is soluble in water, the copolymer can be recovered in the form of a precipitate by throwing the reaction mixture into water.

In case this removal of the solvent should be performed under reduced pressure at a temperature higher than the softening point of the resulting resin (A), namely while keeping the resin in the molten state, if the copolymer (A) has a high functional group concentration, for example, if the proportion of the hydroxyl group- and glycidyl group-containing monomers exceeds 30% by weight of the sum of unsaturated compounds, at the step of removing the solvent, cross-linking is caused among the polymer molecules because of the cleavage of the glycidyl group by the action of heat. At a baking temperature, which is generally higher than 130° C., such cross-linked polymer has degraded flow characteristics and the resulting coating is inferior in the surface smoothness. In an extreme case, gelation is caused at the pretreatment step. Accordingly, when the glycidyl group-containing compound (d) is used for the production of the acrylic copolymer (A), it is necessary to prevent such undesired cross-linking owing to the cleavage of the glycidyl group.

For this purpose, in this invention, there is adopted a method in which two kinds of copolymers are synthesized separately and these copolymers are blended to obtain a resin blend which is substantially identical with the copolymer (A) as set forth above.

More specifically, a hydroxyl group-containing copolymer ($\alpha$) synthesized from 15 to 50% by weight of a hydroxyl group-containing unsaturated compound (a) and 85 to 50% by weight of an unsaturated compound (b) copolymerizable with the unsaturated compound (a) is blended with grycidyl group- and/or hydroxyl group-containing copolymer ($\beta$) synthesized from 6 to 30% by weight of a mixture of a glycidyl group-containing unsaturated compound (d) and a hydroxyl group-containing unsaturated compound (a) and 94 to 70% by weight of an unsaturated compound (b) copolymerizable with said compound (a) and said compound (d).

Namely, the copolymers ($\alpha$) and ($\beta$) synthesized separately are subjected independently to the solvent-removing operation, and they are then blended in the solid state at such a mixing ratio as will provide the above-mentioned proportion among the unsaturated compounds (a), (b) and (d) in the resulting copolymer blend.

In this case, in the copolymer ($\beta$), the amount of the hydroxyl group-containing compound (a) is such that it occupies up to 15% by weight, preferably 3 to 15% by weight, of the sum of the unsaturated compounds (a), (b) and (d) constituting the copolymer ($\beta$). If the amount of the hydroxyl group-containing compound (a) in the copolymer ($\beta$) is smaller than 3% by weight, sufficient cross-linking is not caused in the blend polymer, and the resulting coating film is inferior in the mechanical strength, water resistance and corrosion resistance. The total amount of the hydroxyl group-containing unsaturated compound (a) and the glycidyl group-containing compound (d) in the copolymer blend may be adjusted variously as far as the above-mentioned proportion among the unsaturated compounds (a), (b) and (d) is attained in the copolymer blend, but it is generally preferred that the total amount of the hydroxyl group-containing unsaturated compound (a) and the glycidyl group-containing unsaturated compound (b) in the copolymer blend be 10 to 35% by weight based on the sum of the unsaturated compounds (a), (b) and (d) in the copolymer blend. If the total amount of the compounds (a) and (d) is smaller than 10% by weight, the composition is inferior in the curing property and if the total amount of the unsaturated compounds (a) and (d) is larger than 35% by weight, the resulting coating film is inferior in the water resistance and corrosion resistance.

As is apparent from the foregoing illustration, even if the glycidyl group-containing unsaturated compound (d) is used as one component of the thermosetting coating composition of this invention, if the above-mentioned polymer blending method is adopted, a resinous composition which is very stable even when the solvent is removed at temperatures higher than the softening point of the resin, namely while keeping the resin in the molten state, can be provided. Of course, this copolymer blend can also be used for the production of a solvent-type paint.

When the thermosetting coating composition of this invention is used for the production of a powder paint, in order to improve the flow characteristics, prevent blocking (improve the storage stability) and improve such properties as the surface smoothness and adhesion of the resulting coating film, it is preferred that the softening point of the acrylic copolymer (A) be 40° to 120° C. and the number average molecular weight of the acrylic copolymer (A) be 2,000 to 30,000, especially 7,000 to 20,000. When the thermosetting coating composition of this invention is used for the production of a solvent-type paint, it is preferred that the number average molecular weight of the acrylic copolymer (A) be 5,000 to 150,000, especially 20,000 to 100,000. When the number average molecular weight of the copolymer (A) is too low, the properties of the resulting coating film are degraded and if the number average molecular weight of the copolymer (A) is too high, the handling characteristics of the resulting paint are degraded.

The thermosetting coating composition of this invention is formed by incorporating in the so prepared acrylic copolymer (A) a specific novel curing agent that is solid at room temperature.

One of critical features of this invention resides in the finding that when at least one member (B) selected from the group consisting of N-acylpolylactam compounds represented by the general formula (I)

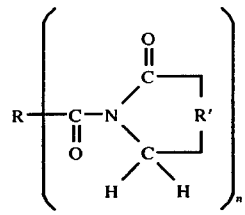

wherein R is an alkylene group having 2 to 12 carbon atoms, preferably 4 to 8 carbon atoms, which may include 1 to 2 nitrogen or oxygen atoms or may contain locally an unsaturated linkage, a di- to tetra-valent benzene nucleus which may have a substituent on the benzene nucleus, or a di- to tri-valent heterocyclic residue having 3 to 15 carbon atoms; R' stands for an alkylene group having 1 to 11 carbon atoms, preferably 3 to 8 carbon atoms; and n is an integer of 2 to 4, and an N-acylpolyimide compound represented by the general formula (II)

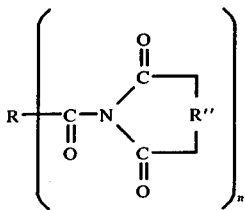

wherein R and n are as defined above and R" stands for an alkylene group having 1 to 11 carbon atoms, preferably 3 to 8 carbon atoms or a di-valent benzene nucleus, is incorporated in the acrylic copolymer (A) as a curing agent, there can be obtained a thermosetting coating composition which can provide an excellent paint, especially a powder paint which does not cause blocking at a temperature lower than 50° C. and can give a coating film free of yellowing and excellent in the water resistance.

It has not been known that these compounds represented by the above general formulae (I) and (II) can be used as curing agents for thermosetting coating compositions and exhibit such excellent effects as mentioned above.

In general, the above novel curing agent (cross-linking agent) is incorporated in an amount of 5 to 40 parts by weight per 100 parts by weight of the acrylic copolymer (A). It is preferred that the amount of the curing agent (B) be 10 to 20 parts by weight per 100 parts by weight of the acrylic copolymer (A). When the amount of the curing agent (B) is smaller than 5 parts by weight per 100 parts by weight of the acrylic copolymer (A), the curing characteristics of the resulting composition are insufficient, and if the amount of the curing agent (B) is larger than 40 parts by weight of the acrylic copolymer (A), the cured coating film is insufficient in the adhesion and flexibility.

The thermosetting coating composition comprising the acrylic copolymer (A) and the curing agent (B) at the above-mentioned compounding ratio has a suitably long gelation time and when the temperature is elevated beyond a certain level for baking, cross-linking reaction is allowed to proceed violently and promptly in the coating composition to form a coating having a good appearance. A high quality coating film having a thickness of 40 μ or smaller can easily be prepared from this thermosetting coating composition.

As the curing agent (B) represented by the general formula (I) or (II), there are preferably employed terephthaloyl-bis-(N-pyrrolidone), adipolyl-bis-(N-pyrrolidone), terephthaloyl-bis-(N-caprolactam), isophthaloyl-bis-(N-caprolactam), sebacoyl-bis-(N-caprolactam), adipoyl-bis-(N-caprolactam), isophthaloyl-bis-(N-succinimide), sebacoyl-bis-(N-phthalimide), fumaloyl-bis-(N-caprolactam), fumaloyl-bis-(N-succinimide), diglycoyl-bis-(N-caprolactam), diglycoyl-bis-(N-succinimide), trimelloyl-tris-(N-caprolactam),

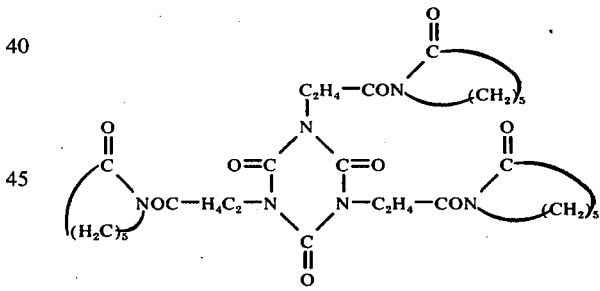

These compounds (B) are generally prepared by subjecting an acid chloride of a polybasic carboxylic acid and a lactam compound or imide compound or its alkali metal salt to dehydrochlorination or desalting reaction.

The thermosetting coating composition of this invention may further comprise an epoxy resin. When an epoxy resin is incorporated in the thermosetting coating composition of this invention comprising the acrylic copolymer (A) and the curing agent (B), such properties as the adhesion, corrosion resistance and flexibility of the resulting coating film can be highly improved. Although the amount of the epoxy resin is not particularly critical, but it is generally preferred that the epoxy resin be incorporated in an amount of 3 to 15% by weight based on the acrylic copolymer (A). If the amount of the epoxy resin is smaller than 3% by weight based on the copolymer (A), no substantial effect can be attained by addition of the epoxy resin. If the amount of the epoxy resin is larger than 15% by weight based on the acrylic monomer (A), the blocking resistance is degraded in the case of a powder paint and when the epoxy resin is of the bis-phenol type, the resulting composition cannot be put into practical use as a paint, because the resulting coating film is inferior in the weather resistance, the resistance to outdoor exposure and the luster and occurrence of chalking is extreme.

As the epoxy resin to be incorporated into the thermosetting coating composition of this invention, there can be employed, for example, bis-phenol-epihalohydrin reaction products such as Epikote 1001, Epikote 1004, Epikote 1007 and Epikote 1009 (trademarks for products manufactured by Shell International Chemicals), other bis-phenol type epoxy resins, hydrogenated bis-phenol-epihalohydrin reaction products such as EPS-4085 (tradename for the product manufactured by Asahi Denka Kogyo), and alicyclic epoxy resins such as Chissonox 315 and Chissonox 301 (trademarks for products manufactured by Chisso). In case the present resinous composition is formed into a powder paint, there is employed, as the epoxy resin, a bisphenol type solid epoxy resin, an alicyclic type solid epoxy resin or mixture thereof.

Still further, benzoin may be incorporated in the thermosetting coating composition of this invention. By addition of benzoin, formation of pinholes can be effectively prevented. Benzoin is incorporated in the thermosetting coating composition of this invention in an amount of 0.1 to 6% by weight, preferably 0.5 to 3% by weight, based on the acrylic copolymer (A). When the amount of benzoin is smaller than 0.1% by weight based on the acrylic copolymer (A), no substantial effect of preventing formation of pinholes can be attained by addition of benzoin. When the amount of benzoin is larger than 6% by weight, a free flowability is degraded in the case of a powder paint and yellowing is readily caused in the resulting cured coating film.

The thermosetting coating composition of this invention may further comprise a catalyst, a pigment, a filler and other additives customarily used in this field.

When the thermosetting coating composition of this invention is formed into a powder paint, a flow modifier may be further added.

As the catalyst, there can be employed, for example, imidazole derivatives such as 2-methyl-4-ethylimidazole, 2-methylimidazole and 2-phenylimidazole, teriary amines such as triethylene diamine, N,N-diethylcyclohexylamine and N-methylmorpholine; tetraalkyl ammonium salts such as tetrabutylammonium bromide, tetrabutylammonium chloride and tetrabutyl ammonium iodide; metal salts of carboxylic acids such as zinc naphthenate, cobalt naphthenate, dibutyl tin laurate and lithium benzoate; alkali metal hydroxides and salts such as lithium hydroxide and lithium chloride, and the like. It must be noted that catalysts to be used in this invention are not limited to those exemplified above. In general, such catalyst is used in an amount of 0.05 to 1.0% by weight based on the acrylic copolymer (A).

As the flow modifier, there can be mentioned, for example, Modaflow (trademark for the product manufactured by Monsanto Chemicals) and Aerosil (trademark for the product manufactured by Degussa, Inc.).

As the pigment, there can be employed, for example, titanium dioxide, red iron oxide and carbon black, and as the filler, there can be employed, for example, calcium carbonate and barium sulfate. By adding such filler and other additives appropriately, it is made possible to adjust the properties of the thermosetting coating composition of this invention suitably depending on the intended use.

When the thermosetting coating composition of this invention is formed into a powder paint, the acrylic copolymer (A) and the curing agent (B) are melt-kneaded with additives such as mentioned above, and the melt is cooled, pulverized and sieved to obtain a powder paint having a desired particle size. The so formed powder paint is coated on a substrate by the electrostatic coating method, the fluidized bed dip coating method or the like.

This invention will now be illustrated in detail by reference to the following Examples that by no means limit the scope of this invention. In these Examples, all of "parts" and "%" are by weight.

EXAMPLE 1

480 g of ethyl cellosolve was charged in a 1-liter capacity, four-neck flask equipped with a thermometer, a refluxing cooling tube, a dropping funnel, an agitation rod and a nitrogen-introducing tube, and was heated at 100° C. while passing nitrogen gas through the flask. Then, 320 g of a monomeric mixture comprising 50 parts of styrene, 10 parts of 2-hydroxyethyl methacrylate, 5 parts of methacrylic acid, 35 parts of butyl acrylate and 2 parts of azobisisobutyronitrile (AIBN) as an initiator was added dropwise to the charge of the flask from the dropping funnel over a period of 1.5 hours. After completion of the dropwise addition, a solution comprising 0.5 g of AIBN and 19.5 g of ethyl cellosolve was added dropwise to the mixture in the flask over a period of 1 hour and heating was continued for 4 hours to complete polymerization. The resulting copolymer solution was gradually poured in a large quantity of water under agitation over a sufficiently long time to precipitate the copolymer. The majority of water was removed by decantation, and the residue was dried at 60° C. under reduced pressure (below 5 mm Hg) for 20 hours to obtain a white solid copolymer having a number average molecular weight of 7,000. 100 parts of this copolymer, 20 parts of adipoyl-bis-N-caprolactam, 60 parts of titanium dioxide and 2 parts of Modaflow (trademark for the leveling agent manufactured by Monsanto Chemicals) were charged in a Henschel mixer, and they were mixed for 3 hours and the mixture was melt-kneaded by means of a Cokneader PR-46 (manufactured by Buss Co.) at a barrel temperature of 95° C., a screw temperature of 80° C. and a screw rotation rate 40 rpm. The average residence time was 60 to 100 seconds. The kneaded mixture was immediately cooled and solidified, granulated and comminuted to adjust the particle size below 80 μ. The so obtained powder paint was electrostatically sprayed on a steel plate treated with Bondlite No. 144 so that the film thickness would be 70 to 80 μ, and the coated paint was baked at 180° C. for 30 minutes. Yellowing or other discoloration was not observed on the cured coating film, and it had such softness and flexibility that no crack was formed when it was bent. The coating film was not dissolved in methanol or toluene. General properties of the coating film having a thickness of 70 μ are as follows:

(1) Luster (60° specular surface reflectance, %) : 91.0

(2) Erichsen value (mm) (Erichsen tester, punch diameter = 20 mm) : 6 <

(3) Impact value (cm) (Du Pont type impact tester, load = 500 g, impact core diameter = ½ inch) : 45

(4) Luster retention ratio (%) after 6 months' outdoor exposure in Hitachi city : 97

The adipoyl-bis-N-caprolactam used for the production of the coating composition was prepared in the following manner:

678 g (6 moles) of dried ε-caprolactam was charged in a 1-liter capacity, 4-neck flask equipped with a thermometer, a nitrogen-introducing tube, a dropping funnel, a cooling tube and an agitation rod while a suitable amount of nitrogen gas was sealed in the flask. The charge of the flask was heated at 85° C. and molten. When 183 g (1 mole) of adipoyl chloride was added dropwise to the melt under agitation from a dropping funnel, heat was generated and the temperature was elevated to 90° C. This temperature was maintained for 3 hours and then, the reaction mixture was cooled to room temperature to solidify the reduction product. Then, the solid product was withdrawn from the flask and sufficiently granulated in a mortar. The granulated product was washed several times with 200 g of water and then filtered. The powdery filtration residue was recrystallized from alcohol. The yield of the so obtained crystalline adipoyl-bis-N-caprolactam was 250 g (the theoretical yield being 336 g) and the product was found to have a melting point of 72° to 73° C. The structural formula of this compound is as follows:

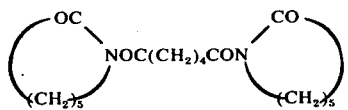

Elementary Analysis as $C_{18}H_{28}O_4N_2$ (molecular weight = 336): Calculated: C = 64.3%, H = 8.3%, N = 8.3%, O = 19.1% Found: C = 64.0%, H = 8.9%, N = 8.3%.

EXAMPLE 2

100 parts of the copolymer obtained in Example 1, 20 parts of sebacoyl-N-caprolactam, 60 parts of titanium dioxide and 2 parts of Modaflow were treated in the same manner as described in Example 1 to obtain a powdery resin composition having a good storage stability and a particle size not exceeding 80 μ. The powder paint was electrostatically spraycoated and baked at 180° C. for 30 minutes to obtain a coating film free of yellowing and having such softness and flexibility that no crack was formed when it was bent. The coating film was not dissolved in methanol or toluene. General properties of the cured coating film having a thickness of 70 μ are as follows:

(1) Luster (60° specular surface reflectance, %) : 90.5

(2) Erichsen value (mm) (Erichsen tester, punch diameter = 20 mm) : 6 <

(3) Impact value (cm) (Du Pont type impact tester, load = 500 g, impact core diameter = ½ inch) : 50 <

(4) Luster retention ratio (%) after 6 months' outdoor exposure in Hitachi city : 95

The sebacoyl-bis-N-caprolactam used for the production of the coating composition was prepared in the same manner as described in Example 1 by using 239 g (1 mole) of sebacoyl chloride and 678 g (6 moles) of ε-caprolactam. The yield of the so obtained sebacoyl-bis-N-caprolactam was 311 g (the theoretical yield being 392 g) and the product was found to have a melting point of 54 to 56° C. The structural formula of this compound is as follows:

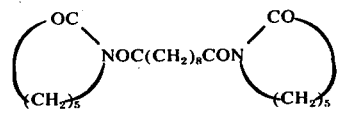

Elementary Analysis as $C_{22}H_{36}N_2O_4$ (molecular weight = 392) :

Calculated: C = 67.3%, H = 9.2%, N = 7.2%, O = 16.3%;

Found: C = 67.1%, H = 9.2%, N = 7.5%.

EXAMPLE 3

In the same manner as described in Example 1, a copolymer was synthesized from 10 parts of 2-hydroxypropyl methacrylate, 5 parts of methacrylic acid, 45 parts of methyl methacrylate, 30 parts of butyl methacrylate, 10 parts of ethyl acrylate and 3 parts of AIBN as an initiator. The copolymer had a number average molecular weight of 7,000. In the same manner as described in Example 1, a powder paint resinous composition having a good storage stability and a particle size not exceeding 80 μ was prepared from 100 parts of the so obtained copolymer, 20 parts of adipoly-bis-N-caprolactam prepared in Example 1, 60 parts of titanium oxide and 2 parts of Modaflow. This powder paint was electrostatically spray-coated according to the method described in Example 1 and baked at 180° C. for 30 minutes.

The resulting cured coating film was free of discoloration such as yellowing and it was not cracked at all when it was bent. General properties of the cured coating film having a thickness of 70 μ are as follows:

(1) Luster (60° specular surface reflectance %) : 90.0

(2) Erichsen value (mm) (Erichsen tester, punch diameter = 20 mm) : 5.9

(3) Impact value (cm) (Du Pont type impact tester, load = 500 g, impact core diameter = ½ inch) : 40

(4) Luster retention ratio (%) after 6 months' outdoor exposure in Hitachi city : 96

EXAMPLE 4

A powder paint resinous composition having a good storage stability and a particle size not exceeding 80 μ was prepared from 100 parts of the copolymer obtained in Example 1, 20 parts of adipoly-N-succinimide, 60 parts of titanium dioxide and 2 parts of Modaflow according to the method described in Example 1. Then, in the same manner as described in Example 1, the composition was electrostatically spray-coated and baked at 180° C. for 30 minutes to obtain a coating film free of discoloration such as yellowing and having such softness and elasticity that no crack was formed when it was bent. The coating film was not dissolved in methanol or toluene. General properties of the cured coating film having a thickness of 70 μ are as follows:

(1) Luster (60° specular surface refectance, %) : 92.5

(2) Erichsen value (mm) (Erichsen tester, punch diameter = 20 mm) : 6 <

(3) Impact value (cm) (Du Pont type impact tester, load = 500 g, impact core diameter = ½ inch): 45

(4) Luster retention ratio (%) after 6 months' outdoor exposure in Hitachi city : 94

The adipoly-bis-N-succinimide used for the preparation of the powder paint was synthesized in the following manner:

The same reaction vessel as used in Example 1 was charged with 594 g (6 moles) of dried succinimide and 400 g of dehydrated and purified dimethylformamide, and the mixture was of adipoyl chloride was added dropwise to the solution under agitation from the dropping funnel, heat was generated and the temperature was elevated to 90° C. This temperature was maintained for 3 hours, and the reaction product was cooled to room temperature.

The so obtained reaction product was gradually added dropwise to 5,000 g of water to form a white precipitate. The filtration was conducted, and the powdery filtration residue was washed several times with 200 g of water and recrystallized from alcohol.

The yield of the so obtained crystalline adipoyl-bis-N-succinimide was 231 g (the theoretical yield being 308 g). The structural formula of this compound is as follows:

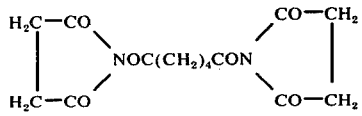

Elementary Analysis as $C_{14}H_{16}N_2O_6$ (molecular weight = 308): Calculated C = 54.5%, H = 5.2%, N = 9.1%, O = 31.2%; Found: C = 55.2%, H = 6.1%, N = 9.0%.

EXAMPLE 5

According to the method described in EXAMPLE 1, a copolymer having a number average molecular weight of 18,000 was prepared from 40 parts of styrene, 25 parts of 2-hydroxyethyl methacrylate, 25 parts of butyl acrylate, 10 parts of methyl methacrylate and 1.5 parts of AIBN as an initiator. In the same manner as described in Example 1, a powder paint coating composition having a particle size not exceeding 80 μ was prepared from 100 parts of the so obtained copolymer, 35 parts of terephthaloyl-bis-(N-caprolactam), 92 parts of titanium dioxide and 2 parts of Modaflow. The resulting coating composition was found to have a good storage stability.

In the same manner as described in Example 1, the coating composition was electrostatically spray-coated so that the thickness of the coating film would be 35 to 45 μ, and baked at 180° C for 30 minutes.

The so obtained cured coating film had a sufficient hiding power, was free of discoloration such as yellowing and was not cracked when bent. Properties of the coating film having a thickness of 40 μ are as follows:

(1) Luster (60° C. specular surface reflectance, %) : 90.5

(2) Erichsen value (mm) (Erichsen tester, punch diameter = 20 mm) : 70

(3) Impact value (cm) (Du Pont type impact tester, load = 500 g, impact core diameter = ½ inch) : 40

(4) Luster retention ratio (%) after 6 months' outdoor exposure in Hitachi city : 96

The terephthaloyl-bis-(N-caprolactam) used in this Example was prepared in the following manner:

203 g (1.0 mole) of terephthaloyl chloride was charged in a 2-liter capacity, 4-neck flask equipped with a thermometer, a nitrogen gas-introducing tube, a dropping funnel and an aditation rod, and 600 g of toluene was added thereto to form a solution. Then, a solution of 237.3 g (2.1 moles) of ε-caprolactam and 254.1 g (2.1 moles) of dimethylaniline in 400 g of toluene was added dropwise to the charge of the flask from the dropping funnel over a period of 30 minutes. Heat was generated with advance of reaction and the temperature was elevated to about 50° C. Then, the temperature was elevated to 80° C. and the reaction was continued for 90 minutes. Crystallized terephthaloyl-bis-(N-caprolactam) and dimethylaniline hydrochloride were separated by filtration, and dimethylaniline hydrochloride was washed away with dilute hydrochloric acid and water and the residue was dried and recrystallized from chloroform to obtain 231.4 g of terephthaloyl-bis-(N-caprolactam) (the theoretical yield being 356 g) having a melting point of 194° to 198° C. The structural formula of this compound is as follows:

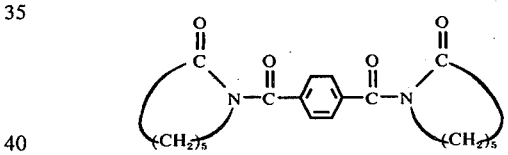

Elementary Analysis: Calculated: C = 67.4%, H = 6.7%, N = 7.9%; Found: C = 67.5%, H = 6.6%, N = 7.8%.

EXAMPLE 6

In the same manner as described in Example 1, a powder paint having a good storage stability and a particle size not exceeding 80 μ was prepared from 100 parts of the copolymer obtained in Example 5, 35 parts of isophthaloyl-bis-(N-caprolactam), 60 parts of titanium dioxide, 6 parts of an epoxy resin (Epikote No. 1004) and 2 parts of Modaflow.

In the same manner as described in Example 1, this powder paint was electrostatically spray-coated and baked at 180° C. for 30 minutes. The resulting cured coating film was free of discoloration such as yellowing and was not cracked when bent. Properties of the coating film having a thickness of 70 μ are as follows:

(1) Luster (60° specular surface refectance, %) : 91.5

(2) Erichsen value (mm) (Erichsen tester, punch diameter = 20 mm) : 7.0

(3) Impact value (cm) (Du pont type impact tester, load = 500 g, impact core diameter = ½ inch) : 45

(4) Luster retention ratio (%) after 6 months' outdoor exposure in Hitachi city : 90.5

(5) Corrosion resistance (JIS 7030, dipping time = 480 hours) : 0 – 1 mm rust width (6) Boiling water resistance (allowed to stand still in boiling water for 4 hours) : not changed The isophthaloyl-bis-(N-caprolactam) used in this Example was prepared in the following manner:

678 g (6 moles) of dried ε-caprolactam was charged in a 1-liter capacity, 4-neck flask equipped with a thermometer, a nitrogen gas-introducing tube, a dropping funnel and an agitation rod while a suitable amount of nitrogen gas was sealed in the flask, and the charge was heated at 85° C. to melt it. Then, 203 g (1 mole) of isophthaloyl chloride was added little by little to the melt over a period of 1 hour under agitation. Heat was generated with advance of reaction and the temperature was elevated to 90° C. This temperature was maintained for 5 hours, and the reaction product was cooled to room temperature to solidify it. The solid reaction product was withdrawn from the flask and pulverized in a mortar. The pulverized product was washed several times with 2,000 g of water and filtered. The powdery filtration residue was recrystallized from alcohol to obtain crystalline isophthaloyl-bis-(N-caprolactam) having the following structural formula:

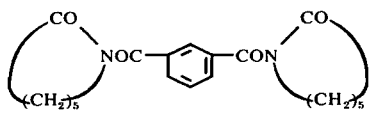

The yield was 150 g (the theoretical yield being 356 g), and the product was found to have a melting point of 138° to 140° C.

Elementary Analysis as $C_{20}H_{24}O_4N_2$ (molecular weight = 356): Calculated: C = 67.4%, H = 6.7%, N = 7.9%, O = 18.0%; Found: C = 67.0%, H = 6.6%, N = 7.1%.

EXAMPLE 7

(i) Synthesis of Acrylic Copolymer 480 g of ethyl cellosolve was charged in a 1-liter capacity, 4-neck flask equipped with a thermometer, a refluxing cooling tube, a dropping funnel, an agitation rod and a nitrogen gas-introducing tube, and heated at 100° C. while passing nitrogen gas through the flask. Then, 320 g of a monomeric mixture comprising 50 parts of styrene, 12.5 parts of 2-hydroxypropyl methacrylate, 7.5 parts of glycidyl methacrylate, 10 parts of methyl methacrylate, 20 parts of butyl acrylate and 1.5 parts of azobisisobutyronitrile (AIBN) as an initiator was added dropwise to the charge of the flask over a period of 1.5 hours from the dropping funnel. After completion of the dropwise addition, a solution comprising 0.5 g of AIBN and 19.5 g of ethyl cellosolve was further added dropwise over a period of 1 hour. Heating was continued for 4 hours to complete polymerization. The resulting copolymer solution was gradually poured in a large quantity of water under sufficient agitation to precipitate the resulting polymer. The majority of water was removed by decantation and the residue was dried at 60° C. under reduced pressure (below 5 mm Hg) for 20 hours to obtain a light-yellow solid acrylic copolymer having a number average molecular weight of 15,000, which could easily be powdered.

(ii) Formation of Powder Paint:

The powdery acrylic copolymer (100 parts) prepared in (i) above was compounded with 25 parts of isophthaloyl-bis-(N-caprolactam) obtained in Example 6, 7 parts of Epikote No. 1004 (trademark for the epoxy resin manufactured by Shell International Chemicals), 60 parts of titanium dioxide and 2 parts of Modaflow (trademark for the leveling agent manufactured by Monsanto Chemicals). The mixture was charged in a Henschel mixer and blended for 5 minutes, and melt-kneaded by means of Cokneader PR-40 (manufactured by Buss Co.) at a barrel temperature of 95° C., a screw temperature of 80° C. and a screw rotation rate of 40 rpm. The average residence time was 60 to 100 seconds. The kneaded mixture was cooled and solidified, granulated and comminuted to obtain a powdery composition having a particle size not exceeding 80 μ. The so formed powder paint was electrostatically spray-coated on a steel plate treated with Bondlite No. 144 so that the thickness of the coating film would be 70 to 80 μ. The coating was baked at 180° C. for 30 minutes. The cured coating film was free of discoloration such as yellowing and it had such softness and flexibility that it was not cracked when bent. The coating film was not dissolved in methanol or toluene. General properties of the coating film having a thickness of 70 μ are as follows:

(1) Luster (60° reflectance, %) : 96.0

(2) Erichsen value (mm) (Erichsen tester, punch diameter = 20 mm) : 6 <

(3) Impact value (cm) (Du Pont type impact tester, load = 500G, impact core diameter = ½ inch): 45

(4) Luster retention ratio (%) after 6 months' outdoor exposure in Hitachi city: 96

EXAMPLE 8

In accordance with the method described in (i) of Example 7, an acrylic copolymer was synthesized from 40 parts of methyl methacrylate, 10 parts of ethyl acrylate, 20 parts of butyl acrylate, 20 parts of 2-hydroxyethyl methacrylate, 10 parts of glycidyl methacrylate and 3 parts of AIBN as an initiator. The so obtained copolymer had a number average molecular weight of 12,000. Then 100 parts of this copolymer was compounded with 20 parts of terephthaloyl-bis-(N-caprolactam), 7 parts of Epikote No. 1004, 0.1 part of lithium chloride, 60 parts of titanium dioxide and 2 parts of Modaflow. In the same manner as described in (ii) of Example 7, the mixture was treated to obtain a powdery resinous composition having a good storage stability and a particle size not exceeding 80 μ. The composition was then electrostatically spray-coated in the same manner as described in (ii) of Example 7 and baked at 180° C. for 30 minutes. The so formed coating film was free of discoloration such as yellowing and had such softness and flexibility that no crack was formed when it was bent. The coating film was not dissolved in methanol or toluene. General properties of the coating film having a thickness of 70 μ are as follows:

(1) Luster (60° reflectance, %) : 90.5

(2) Erichsen value (mm) (Erichsen tester, punch diameter = 20 mm) : 6 <

(3) Impact value (cm) (Du Pont type impact tester, load = 500 g, impact core diameter = ½ inch) : 45

(4) Luster retention ratio (%) after 6 months' outdoor exposure in Hitachi city : 94

EXAMPLE 9

A mixture of 100 parts of the acrylic copolymer obtained in Example 7-(i), 20 parts of adipoyl-bis-(N-succinimide) obtained in Example 4, 60 parts of titanium dioxide and 2 parts of Modaflow was treated in the same manner as described in Example 7-(ii) to obtain a powder paint having a particle size not exceeding 80 $\mu$. Then, the so formed powder paint was electrostatically spray-coated in the same manner as described in Example 7-(ii) and baked at 180° C. for 30 minutes. The resulting coating film was free of discoloration such as yellowing and had such softness and flexibility that no crack was formed when it was bent. The coating film was not dissolved in methanol or toluene. General properties of the coating film having a thickness of 70 $\mu$ are as follows:

(1) Luster (60° reflectance, %) : 94.2
(2) Erichsen value (mm) (Erichsen tester, punch diameter = 20 mm) : 6 <
(3) Impact value (cm) (Du Pont type impact tester, load = 500 g, impact core diameter = ½ inch) : 50
(4) Luster retention ratio (%) after 6 months' outdoor exposure in Hitachi city : 93

EXAMPLE 10

According to the method described in Example 7-(i), an acrylic copolymer was synthesized from 45 parts of styrene, 22.5 parts of butyl acrylate, 20 parts of 2-hydroxyethyl methacrylate, 12.5 parts of glycidyl methacrylate and 2.0 parts of AIBN as an initiator. The resulting copolymer solution was thrown into a large quantity of water, and the precipitate was dried at 60° C. under reduced pressure (below 5 mm Hg) for 10 hours to obtain a light-yellow solid acrylic copolymer having a number average molecular weight of 12,000 and a softening point of 99° to 101° C.

100 parts of the so obtained copolymer having a softening point of 99° to 101° C. was compounded with 20 parts of terephthaloyl-bis-(N-caprolactam) obtained in Example 5, 7 parts of Epikote No. 1004, 60 parts of titanium dioxide and 2 parts of Modaflow. The mixture was treated in the same manner as described in Example 7-(ii) to obtain a powder paint having a good storage stability and a particle size not exceeding 80 $\mu$. According to the method described in Example 7-(ii), the powder paint was electrostatically spray-coated and baked at 180° C. for 30 minutes. The resulting coating film was free of discoloration such as yellowing and had such softness and flexibility that no crack was formed when it was bent. The coating film was not dissolved in methanol and toluene. General properties of the coating film having a thickness of 70 $\mu$ are as follows:

(1) Luster (60° reflectane, %) : 96.5
(2) Erichsen value (mm) (Erichsen tester, punch diameter = 20 mm) : 6 <
(3) Impact value (cm) (Du Pont type impact tester, load = 500 g, impact core diameter = ½ inch) : 40
(4) Luster retention ratio (%) after 6 months' outdoor exposure in Hitachi city : 92

EXAMPLE 11

Two kinds of acrylic copolymers obtained in the same manner as described in Example 7-(i) were blended.

More specifically, a copolymer (I) was synthesized from 45 parts of styrene, 5 parts of methyl methacrylate, 20 parts of butyl acrylate, 30 parts of 2-hydroxyethyl methacrylate and 2.0 parts of AIBN as an initiator, and a copolymer (II) was synthesized from 40 parts of styrene, 5 parts of methyl methacrylate, 20 parts of butyl acrylate, 10 parts of 2-hydroxyethyl methacrylate, 25 parts of glycidyl methacrylate and 2.0 parts of AIBN as an initiator. The so formed copolymer solutions were separately dried at 120° C. under reduced pressure (below 5 mm Hg) for 4 hours to obtain two kinds of light yellow solid copolymers (I) and (II). The copolymer (I) had a number average molecular weight of 12,000 and the copolymer (II) had a number average molecular weight of 13,000, the softening point of the copolymer (II) being 96° to 98° C.

Then, 50 parts of the copolymer (I) and 50 parts of the copolymer (II) were compounded with 20 parts of isophthaloyl-bis-(N-caprolactam) obtained in Example 6, 7 parts of Epikote No. 1004, 0.1 part of di-n-butyl tin dilaurate, 60 parts of titanium dioxide and 2 parts of Modaflow.

The mixture was treated in the same manner as described in Example 7-(ii) to obtain a powder paint having a good storage stability and a particle size not exceeding 80 $\mu$. In the same manner as described in Example 7-(ii), the powder paint was electrostatically spray-coated at 180° C. for 30 minutes. The resulting coating film was free of discoloration such as yellowing and had such softness and flexiblity that no crack was formed when it was bent. The coating film was not dissolved in methanol or toluene. General properties of the cured coating film having a thickness of 70 $\mu$ are as follows:

(1) Luster (60° reflectance, %) : 97.5
(2) Erichsen value (mm) (Erichsen tester, punch diameter = 20 mm) : 6 <
(3) Impact value (cm) (Du Pont Type impact tester, load = 500 g, impact core diameter = ½ inch) : 45
(4) Luster retention ratio (%) after 6 months' outdoor exposure in Hitachi city : 93

EXAMPLE 12

Ethyl cellosolve (230 g) was charged in a 1-liter capacity, 4-neck flask equipped with a thermometer, a refluxing cooling tube, a dropping funnel, an agitation rod and a nitrogen gas-introducing tube, and was heated at 90° C. while introducing $N_2$ gas into the flask. Then, a monomeric mixture comprising 125 g of glycidyl methacrylate, 50 g of 2-hydroxyethyl methacrylate, 175 g of styrene, 150 g of ethyl acrylate and 1.0 g of azobisisobutyronitrile as an initiator was added dropwise to the charge of the flask over a period of 2 hours. After completion of the dropwise addition, a solution comprising 0.5 g of azobisisobutyronitrile and 20 g of ethyl cellosolve was added dropwise to the mixture over a period of 15 minutes. The heating was continued for 4 hours to complete polymerization. The resulting mixture was diluted with 250 g of xylene. The so obtained copolymer solution was characterized by a nonvolatile component content of 49.8%, a Gardner viscosity of X – Y as measured at 25° C., an acid value lower than 1, a hue below 1 and a hydroxyl value 43 as calculated as the solid. 85 parts of this polymer solution was mixed with 20 parts of sebacoyl-bis-(N-caprolactam) obtained in Example 2 (in the form of a 50% solution in methylisobutyl ketone), 5 parts of Epikote No. 1001 (in the form of a 50% solution in ethyl cellosolve) and 50 parts of titanium white (rutile type) by means of a paint roll to obtain a white paint. Results of tests made on this paint are shown in Table 1.

EXAMPLE 13

According to the method described in Example 12, a copolymer was prepared from 75 parts of glycidyl methacrylate, 75 parts of 2-hydroxyethyl acrylate, 250 parts of methyl methacrylate and 100 parts of butyl acrylate. The resulting copolymer solution was characterized by a non-volatile component content of 49.9%, a Gardner viscosity of Y – Z as measured at 25° C., a hue below 1 and a hydroxyl value of 65 as calculated as the solid. Then, 80 parts of this polymer solution was kneaded with 15 parts of adipoyl-bis-(N-caprolactam) obtained in Example 1 (in the form of a 50% solution in methylethyl ketone), 5 parts of Epikote No. 1001 (in the form of a 50% solution in ethyl cellosolve) and 50 parts of titanium white (rutile type) by means of a paint roll to obtain a white paint. Results of tests made on this paint are shown in Table 1.

EXAMPLE 14

According to the method described in Example 12, a copolymer was prepared from 125 parts of glycidyl acrylate, 125 parts of hydroxypropyl methcrylate, 150 parts of styrene and 125 parts of n-butyl methacrylate. The resulting copolymer solution was characterized by a non-volatile component content of 49.6%, a Gardner viscosity of Z – $Z_1$ as measured at 25° C., a hue below 1 and a hydroxyl value of 86.6 as calculated as the solid. Then, 75 parts of this polymer solution was kneaded with 10 parts of isophthaloyl-bis-(N-caprolactam) obtained in Example 6 (in the form of a 50% solution in methylisobutyl ketone) and 15 parts of Epikote No. 1001 (in the form of a 50% solution in ethyl cellosolve) by means of a paint roll to obtain a white paint. Results of tests made on this paint are shown in Table 1.

EXAMPLE 15

According to the method described in Example 12, a copolymer was prepared from 50 parts of hydroxyethyl methacrylate, 50 parts of glycidyl methacrylate, 225 parts of ethyl acrylate and 200 parts of vinyltoluene. The resulting copolymer solution was characterized by a non-volatile component content of 50.1%, a Gardner viscosity of W as measured at 25° C., a hue below 1 and a hydroxyl value of 21.5 as calculated as the solid. Then, 80 parts of this polymer solution was kneaded with 20 parts of adipoyl-bis-(N-succinimide) obtained in Example 4 (in the form of a 50% solution in methylethyl ketone) and 50 parts of titanium white (rutile type) by means of a paint roll to form a white paint. Results of tests made on this paint are shown in Table 1.

Each of the paints obtained in Examples 12 to 15 was coated on a steel plate treated with Bondlite 144, so that the thickness of the coating film would be 30 to 35 μ, and the coating was baked at 160° C. for 30 minutes. Properties of the so formed coating films were determined to obtain results shown in Table 1.

Table 1

| Item | Test Results | | | |
|---|---|---|---|---|
| | Ex. 12 | Ex. 13 | Ex. 14 | Ex. 15 |
| Luster (60° specular surface reflectance, %) | 92 | 93 | 90 | 95 |
| Pencill hardness | 2H | 2H | 2H | 2H |
| Square cut adhesion test[1] | 100/100 | 100/100 | 100/100 | 100/100 |
| Erichsen value (mm) (Erichsen tester, puch diameter = 20 mm) | 7 | 7 | 7 | 7 |
| Corrosion resistance[2] (rust width, mm) | 0 | 0 | 0 | 0 |
| Alkali resistance[3] | not changed | not changed | not changed | not changed |
| Weather resistance[4] (luster retention ratio, %) | 85 | 89 | 82 | 91 |
| Boiling water resistance[5] | not changed | not changed | not changed | not changed |

Notes:
[1] The coating was cut with a knife to form 100 cut squares having a side of 1 mm, and an adhesive cellophane tape was applied to the coating and peeled. The number of cut squares left on the substrate was counted.
[2] The corrosion resistance test was conducted according to JIS 2030. The dipping time was 240 hours.
[3] Each sample was dipped in 5 % aqueous solution of NaOH for 144 hours.
[4] A sunshine weather-ometer was used. Each sample as exposed to irradiation for 500 hours and the luster retention ratio (%) was determined.
[5] Each sample was dipped in boiling water for 2 hours.

As is apparent from the foregoing, the thermosetting coating composition of this invention can provide coating films excellent in weather resistance, adherence, solvent resistance, corrosion resistance and surface characteristics such as luster. Further, the composition of this invention has a good pigment dispersibility and it can be formed in a very thin film. The thermosetting coating composition can be formed into either a powder paint or a solvent type paint. A powder paint prepared from the thermosetting coating composition has a high blocking resistance and hence, is excellent in the storage stability.

What is claimed is:

1. A thermosetting coating composition comprising (A) 100 parts by weight of a copolymer obtained by copolymerizing (a) 5 to 40% by weight of at least one unsaturated compound containing a hydroxyl group selected from the group consisting of hydroxyalkyl acrylates, hydroxyalkyl methacrylates and acrylic and methacrylic esters of glycols, glycerine, trimethylol propane and pentaerythritol and (b) 60 and 95% by weight of an unsaturated compound copolymerizable with said compound (a) and being at least one member selected from the group consisting of styrene type monomers, alkyl acrylates, alkyl methacrylates, vinyl acetate, acrylonitrile and acrylamide, said copolymer (A) having a number average molecular weight of 2,000 to 150,000 and (B) 5 to 40 parts by weight of at least one member selected from the group consisting of an N-acylpolylactam compound represented by the general formula $$\left[ R - \begin{array}{c} C - N \\ \| \\ O \end{array} \begin{array}{c} O \\ \| \\ C - \\ \diagdown \\ C - \\ / \diagdown \\ H \quad H \end{array} R' \right]_n$$

wherein R is an alkylene group having 2 to 12 carbon atoms, which may include 1 to 2 nitrogen or oxygen atoms, or may contain locally an unsaturated linkage, a di- to tetra-valent benzene nucleus, which may have a substituent on the benzene nucleus, or a di- to trivalent heterocyclic residue having 3 to 15 carbon atoms; R' stands for an alkylene group having 1 to 11 carbon atoms; and $n$ is an integer of 2 to 4, an N-acylopolyimide compound represented by the general formula

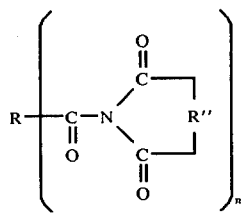

wherein R and $n$ are as defined above and R" stands for an alkylene group having 1 to 11 carbon atoms or a divalent benzene nucleus, and mixtures thereof.

2. A thermosetting coating composition as set forth in claim 1 wherein the copolymer (A) has a softening point of 40° to 120° C. and a number average molecular weight of 2,000 to 30,000.

3. A thermosetting coating composition as set forth in claim 1 wherein the compound (a) is at least one member selected from the group consisting of 2-hydroxyethyl acrylate, 2-hydroxypropyl acrylate, 2-hydroxyethyl methacrylate, 2-hydroxypropyl methacrylate, ethylene glycol monoacrylate, ethylene glycol monomethacrylate, propylene glycol monoacrylate, propylene glycol monomethacrylate, butylene glycol monoacrylate and butylene glycol monomethacrylate.

4. A thermosetting coating composition as set forth in claim 1 wherein the compound (b) is at least one member selected from the group consisting of styrene, vinyl toluene, α-methylstyrene, methyl acrylate, ethyl acrylate, propyl acrylate, butyl acrylate, methyl methacrylate, ethyl methacrylate, propyl methacrylate, vinyl acetate, acrylonitrile and acrylamide.

5. A thermosetting coating composition as set forth in claim 1 wherein the compound (B) is at least one member selected from the group consisting of terephthaloyl-bis-(N-pyrrolidone), adipoyl-bis-(N-pyrrolidone), terephthaloyl-bis-(N-caprolactam), isophthaloyl-bis-N-caprolactam, sebacoyl-bis-(N-caprolactam), adipoyl-bis-(N-caprolactam), isophthaloyl-bis-(N-succinimide), sebacoyl-bis-(N-phthalimide), fumaloyl-bis-(N-caprolactam), fumaloyl-bis-(N-succinimide), diglycoyl-bis-(N-caprolactam), diglycoyl-bis-(N-succinimide), trimelloyl-tris-(N-caprolactam),

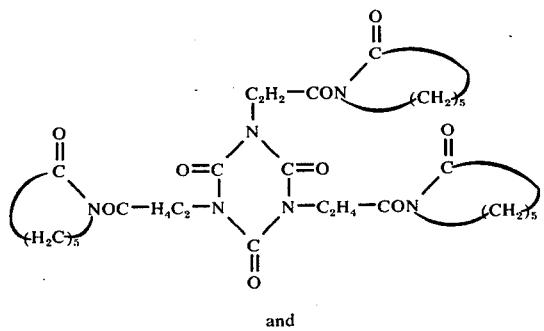

and

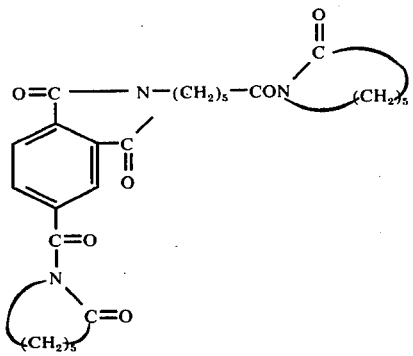

* * * * *